(12) United States Patent
Kim et al.

(10) Patent No.: US 7,496,635 B2
(45) Date of Patent: Feb. 24, 2009

(54) SYSTEM AND METHOD FOR SECURING ONLINE CHAT CONVERSATIONS

(75) Inventors: Steven P. Kim, Raleigh, NC (US); Francisco I. Moraes, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 11/041,321

(22) Filed: Jan. 24, 2005

(65) Prior Publication Data

US 2006/0168449 A1 Jul. 27, 2006

(51) Int. Cl.
*G06F 15/16* (2006.01)
(52) U.S. Cl. .................. 709/206; 709/207; 713/176
(58) Field of Classification Search .................. 709/206, 709/207; 713/176
See application file for complete search history.

(56) References Cited

U.S. PATENT DOCUMENTS

| | | | |
|---|---|---|---|
| 6,332,030 B1 | 12/2001 | Manjunath et al. | |
| 6,647,128 B1 | 11/2003 | Rhoads | |
| 6,744,906 B2 | 6/2004 | Rhoads et al. | |
| 6,769,061 B1 | 7/2004 | Ahern | |
| 7,380,126 B2 * | 5/2008 | Logan et al. ................. | 713/176 |
| 2002/0146149 A1 | 10/2002 | Brunk | |
| 2002/0196272 A1 | 12/2002 | Ramos et al. | |
| 2003/0099373 A1 | 5/2003 | Joo et al. | |
| 2003/0187798 A1 | 10/2003 | McKinley et al. | |
| 2004/0001606 A1 | 1/2004 | Levy | |
| 2004/0015553 A1 * | 1/2004 | Griffin et al. ................. | 709/206 |
| 2004/0021549 A1 | 2/2004 | Choi et al. | |
| 2004/0047489 A1 | 3/2004 | Seo et al. | |
| 2004/0052400 A1 | 3/2004 | Inomata et al. | |
| 2004/0221014 A1 * | 11/2004 | Tomkow ...................... | 709/206 |
| 2005/0198124 A1 * | 9/2005 | McCarthy .................... | 709/203 |
| 2006/0161629 A1 * | 7/2006 | Cohen et al. ................. | 709/206 |

FOREIGN PATENT DOCUMENTS

| | | |
|---|---|---|
| DE | 19930908 A1 | 11/2001 |
| JP | 2000227757 A | 8/2000 |
| JP | 2000330873 A | 11/2000 |
| JP | 2002312284 A | 10/2002 |
| JP | 2003152979 A | 5/2003 |
| JP | 200413710 A | 1/2004 |
| JP | 2004109172 A | 4/2004 |

* cited by examiner

*Primary Examiner*—Frantz B Jean
(74) *Attorney, Agent, or Firm*—David Irving; Hoffman Warnick LLC

(57) ABSTRACT

A system, method and program product for securing online chat conversations. The disclosed method includes the steps of capturing a chat conversation into an image file; adding a watermark to the image file; extracting the watermark from the watermarked image file; and validating the watermark.

3 Claims, 2 Drawing Sheets

SYSTEM AND METHOD FOR SECURING ONLINE CHAT CONVERSATIONS

BACKGROUND OF THE INVENTION

1. Technical Field

The present invention relates generally to validating electronic data, and more specifically relates to a system and method for capturing, securing, and validating online chat conversations.

2. Related Art

Currently, online chat programs, such as AOL INSTANT MESSANGER™ ("AIM") and IBM's SAMETIME™ allow for real-time communication. Until the popularity of such chat programs became integrated into the workplace, email was often the common choice of business communications, allowing a sender to not only express specific details/solutions/ideas related to the business but also served as a repository of information. With chat programs, communication is often quick and swift, allowing for remote direction of instructions, discussions, and other pertinent conversations related to business processes.

Most users now use a combination of both email and chat programs as tools to provide the necessary communications within the business environment. However, the communication that takes place within the context of a chat program is not secure and there is no adequate tool to provide a secure mechanism for validating a past conversation, set of instructions, and so forth, similar to email encryption programs, such as LOTUS NOTES™.

Users that rely upon chat programs to log specific business activity, similar to that performed today with encrypted/archived "Sent" emails, cannot rely on a simple copy/paste operation from the chat program in order to record a conversation. The contents of the conversation can easily be manipulated and in no way can offer any protection. In addition, this issue can be further exacerbated by individuals who use chat programs to casually converse with other employees at work, in which conversations can be changed or used out of context, leading into difficult situations (e.g., sexual harassment, misdirection of instructions, etc.). As chat programs continue to become a mainstream source of business process and function, the need to develop a secure method of capturing/validating online conversations is necessary.

SUMMARY OF THE INVENTION

The present invention addresses the above-mentioned problems, as well as others, by providing a system, method and program product for allowing users to securely export a conversation from a chat program and validate the contents of the conversation. In a first aspect, the invention provides a system for securing online chat conversations, comprising: a chat conversation capture system that captures a chat conversation into an image file; and a watermarking system for adding a watermark to the image file to produce a watermarked image file. In accordance with this aspect, the invention further comprises a verification system that includes: a watermark extraction system for extracting the watermark from the watermarked image file; and a validation system for validating the watermark.

In a second aspect, the invention provides a method for securing online chat conversations, comprising: capturing a chat conversation into an image file; adding a watermark to the image file; extracting the watermark from the watermarked image file; and validating the watermark.

In a third aspect, the invention provides a program product stored on a computer readable medium for securing online textual communications, comprising: program code configured for capturing online textual communications into an image file; and program code configured for adding a watermark to the image file to produce a watermarked image file.

In a fourth aspect, the invention provides a method for deploying an application for securing online chat conversations, comprising: providing a computer infrastructure being operable to: capture a chat conversation into an image file; and add a watermark to the image file.

In a fifth aspect, the invention provides computer software embodied in a propagated signal for securing online chat conversations, the computer software comprising instructions to cause a computer to perform the following functions: capture a chat conversation into an image file; and add a watermark to the image file.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
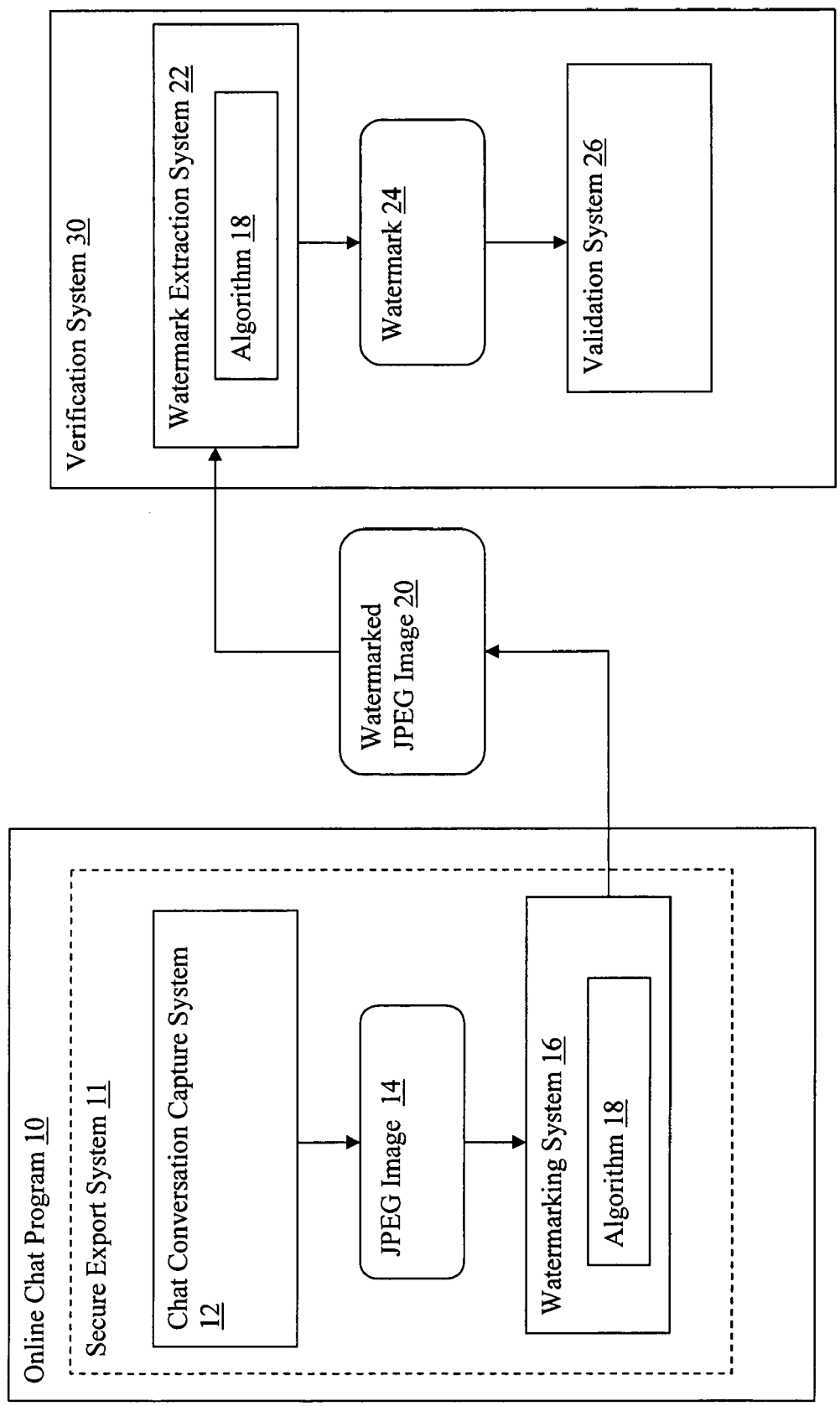
FIG. 1 depicts a system diagram showing the process of securing and validating a chat conversation in accordance with the present invention.

Referring now to the drawings, FIG. 1 depicts: (1) an online chat program 10 that includes a secure export system 11 for securely exporting chat conversations; and (2) a verification system 30 for verifying exported chat conversations. As noted above, online chat programs, such as AIM and SAMETIME, allow multiple users on a network, such as the Internet, to textually communicate in (near) real time. In a typical scenario, two or more users on a network engage in a chat session by typing and viewing text within a user interface provided by the online chat program 10. The operation of online chat programs 10 are well known in the art, and are therefore not described in further detail. Note however that while the invention is described with reference to securing and verifying online chat, the invention could be applied to any online communication where there exists a need to capture, secure and verify electronic text data. Illustrative applications may include online bulletin boards, online publications, email transmissions, Web page data, text messaging, etc.

Secure export system 11 includes a chat conversation capture system 12, which captures the chat conversation from the online chat program 10 to a JPEG image 14. A watermarking system 16 then adds a watermark to the JPEG image 14 to generate a watermarked JPEG image 20. The watermark may comprise any type of watermark, e.g., an invisible fragile watermark, created and embedded using any known algorithm 18.

In general, watermark technology relies on the fact that the human eye is more sensitive to noise in the lower frequency components of an image than in the higher ones. For example, using a JPEG compression, after the DCT (Discrete Cosine Transform) and the quantization steps, the watermark can be inserted into the higher frequency slots of the JPEG 8×8 compression block which normally become zero after the quantization step. Methods to insert watermarks vary and include enforcing a difference between certain slots in the block, always modifying a specific block, etc. It should be noted that while this embodiment is implemented using a JPEG image 14, the invention could be implemented using any other type of image file into which a watermark could be placed, e.g., TIFF, GIF, PDF, etc.

Once the watermarked JPEG image 20 is created, it can be verified by verification system 30, which will ensure that the watermarked JPEG image 20 has not been tampered with. Verification system 30 may be implemented as a standalone process, as part of an online chat program 10, as part of an image viewer, or as part of some other process. Included in verification system 22 is a watermark extraction system 22 that extracts the watermark 24 from the watermarked JPEG image 20 using the same algorithm 18 that export system 11 used to embed the watermark. Once the watermark 24 is extracted, a validation system 26 may be utilized to examine and validate the watermark 24. Any now known or later developed technique for validating the watermark may be utilized (e.g., checksum, etc.).

Figure 2:
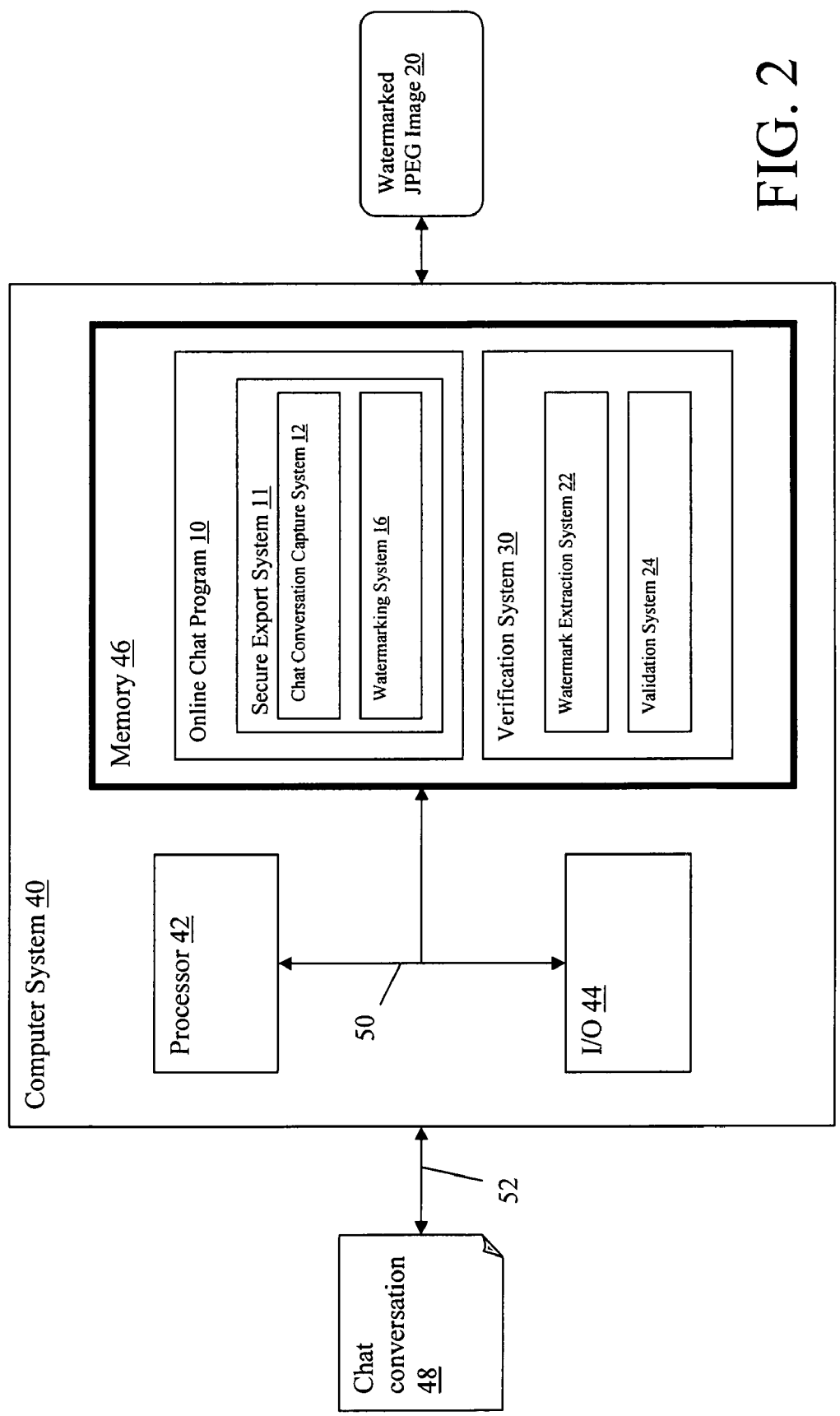
FIG. 2 depicts a computer system having a chat security and validation system in accordance with the present invention.

Referring now to FIG. 2, an illustrative embodiment of a computer system 40 is shown for implementing the invention. Computer system 40 may comprise, e.g., a desktop, a laptop, a workstation, handheld device, etc. Moreover, computer system 40 could be implemented as part of a client and/or a server. Computer system 40 generally includes a processor 42, memory 46, bus 50, input/output interfaces (I/O) 44, external devices/resources such as storage (not shown), etc. The processor 42 may comprise a single processing unit, or be distributed across one or more processing units in one or more locations, e.g., on a client and server. Memory 46 may comprise any known type of data storage and/or transmission media, including magnetic media, optical media, random access memory (RAM), read-only memory (ROM), a data cache, a data object, etc. Moreover, any memory 46 may reside at a single physical location, comprising one or more types of data storage, or be distributed across a plurality of physical systems in various forms.

I/O 44 may comprise any system for exchanging information to/from an external resource. External devices/resources (not shown) may comprise any known type of external device, including speakers, a CRT, LED screen, hand-held device, keyboard, mouse, voice recognition system, speech output system, printer, monitor/display, facsimile, pager, etc. Bus 50 may be included to provide a communication link between each of the components in the computer system 40 and likewise may comprise any known type of transmission link, including electrical, optical, wireless, etc. Although not shown, additional components, such as cache memory, communication systems, system software, etc., may be incorporated into computer system 40.

Stored in memory 40 as a program product is: (1) online chat program 10 that includes a secure export system 11, and (2) verification system 30. As described above, secure export system 11 includes a chat conversation export system 12 and watermarking system 16 capable of generating a watermarked JPEG image of a chat conversation 48. Verification system 30 includes a watermark extraction system 22 and validation system 24 for verifying the watermarked JPEG image 20.

It should be understood that verification system 30 may be implemented independently of chat program 10, or be integrated into chat program 10. Moreover, although described as being integrated with chat program 10, secure export system 11 may likewise be implemented independently of chat program 10. Accordingly, computer system 40 may be implemented as containing one or both of secure export system 11 and verification system 20. Thus, a first computer system may be equipped with the capability to generate a watermarked JPEG image 20 and a second computer system may be equipped with the capability to verify the watermarked JPEG image 20. Alternatively, a single computer system 40 may be equipped with both capabilities.

Either or both of the secure export system 11 and verification system 30 can be made available as plug-ins. The plug-in for the verification system 30 will contain the same algorithm 18 used by the online chat program 10 to embed the watermark 24. The watermark 24 will be extracted from the watermarked JPEG image 20 and validated. If the data is incorrect, the user will be notified that the watermarked JPEG image 20 has been tampered with.

Online chat program 10 provides an online messaging client allows a chat conversation 48 to take place over a network 52. Such a network 52 can be any type of network such as the Internet, a local area network (LAN), a wide area network (WAN), a virtual private network (VPN), a wireless network, etc. Communication could occur via a direct hard-wired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 40 comprising a secure export system 11 and/or verification system 30 could be created, maintained and/or deployed by a service provider that offers the functions described herein for customers. That is, a service provider could offer to secure and/or verify a chat conversation 48.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for securing online chat conversations, comprising:
  a chat conversation capture system that captures a chat conversation into an image file;
  a watermarking system for adding a watermark to the image file to produce a watermarked image file;
  a watermark extraction system for extracting the watermark from the watermarked image file;
  and a validation system for validating the watermark;
  wherein the watermarking system and watermark extraction system both utilize the same algorithm to insert and extract the watermark;
  wherein the chat conversation capture system, the watermarking system, the watermark extraction system and the validation system are integrated into an online chat program; and
  wherein the watermark is used to determine whether or not the image file of the chat conversation has been modified.

2. A method for securing online chat conversations, comprising: capturing a chat conversation into an image file; adding a watermark to the image file; extracting the watermark from the watermarked image file; and validating the watermark;
  wherein adding the watermark system and extracting the watermark both utilize the same algorithm to insert and extract the watermark;
  wherein the capturing and adding steps are initiated from within an online chat program;
  wherein the extracting and validating steps are integrated into an online chat program; and
  wherein the watermark is used to determine whether or not the image file of the chat conversation has been modified.

3. A program product stored on a computer readable medium for securing online textual communications, comprising:
  program code configured for capturing online textual communications into an image file;
  program code configured for adding a watermark to the image file to produce a watermarked image file;
  program code configured for extracting a second watermark from a second watermarked image file; and
  program code configured for validating the second watermark;
  wherein the program code configured for adding the watermark and the program code configured for extracting the second watermark both utilize the same algorithm;
  wherein the online textual communications comprise a chat conversation captured from an online chat program; and
  wherein the watermark is used to determine whether or not the image file of the online textual communications has been modified.

* * * * *